Oct. 28, 1958      L. PÈRAS      2,857,793
TORQUE-LIMITING TOOL HOLDER FOR MACHINE TOOLS
Filed June 1, 1956
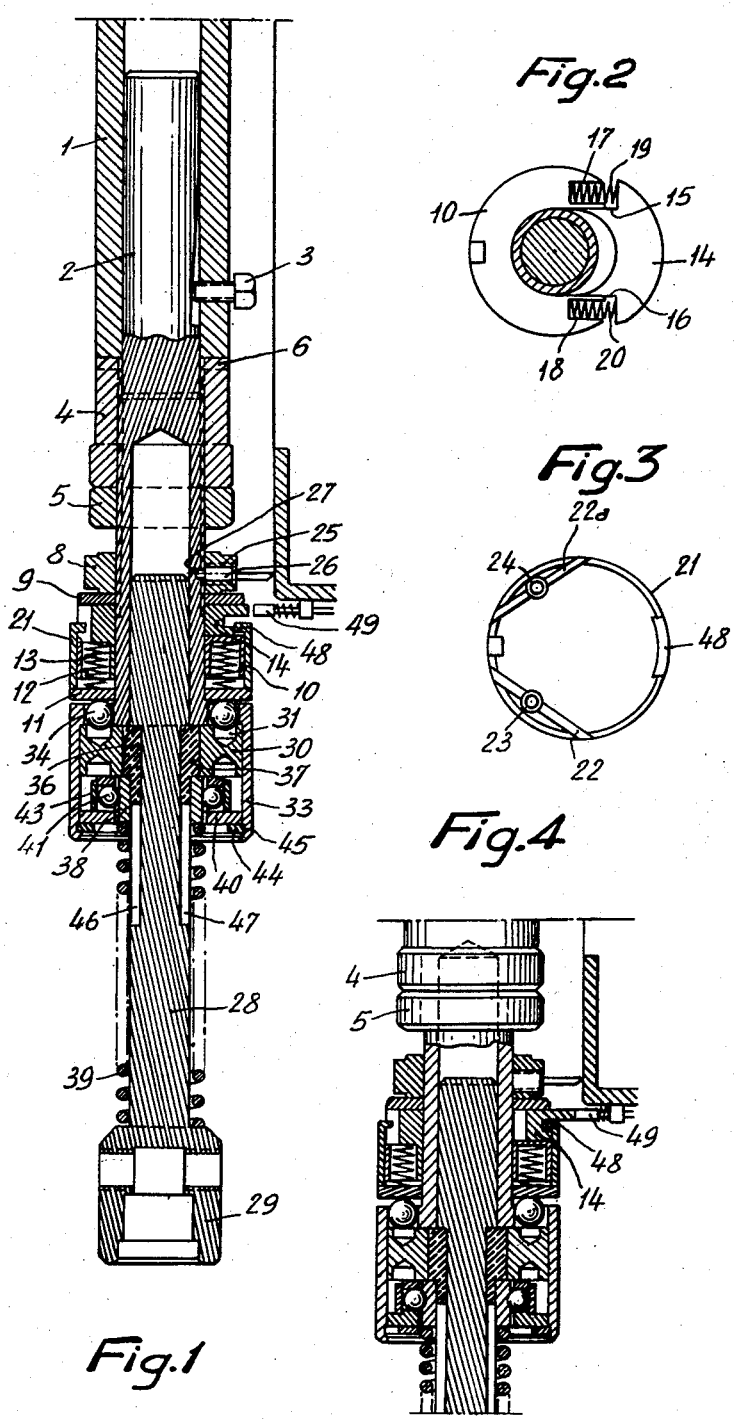

United States Patent Office 2,857,793
Patented Oct. 28, 1958

2,857,793

TORQUE-LIMITING TOOL HOLDER FOR MACHINE TOOLS

Lucien Pèras, Billancourt, France, assignor to Regie Nationale des Usines Renault, Billancourt, France, a French works Application June 1, 1956, Serial No. 588,691

Claims priority, application France June 8, 1955

8 Claims. (Cl. 81—52.4)

This invention relates to tool holders and more particularly to a torque-responsive tool holder. When a rotary cutting tool, such as a drill, tap, milling cutter, etc., is used on a machine tool, the following disadvantage is often found to occur: the force required to drive the tool in rotational movement may suddenly increase owing to a chip becoming jammed, or owing to wear on the tool or for some other reason, and this results in the breaking of the tool, which is rigidly connected to the spindle of the machine.

The invention relates to a tool holder which makes it possible to eliminate this danger of the tools breaking. According to the invention, the cutting tool is carried by a nose piece driven by a tool holder shank fast with the spindle of the machine, the shank and the nose piece being connected together by means of balls which fit into holes in a perforated plate, the force exerted on these balls being adjustable. When the resistant torque exceeds a limiting value, the said balls are moved out of their holes and the tool and its nose piece are immobilised. Moreover, the tool carrier is equipped with an indicating device which comprises a control element which is displaced radially when the driving balls move out of their housing holes.

A torque-limiting tool holder, intended more particularly for driving a tap, will now be described by way of non-limitative example, with reference to the accompanying drawings, wherein:

Fig. 1 is a vertical sectional view of the tool holder in the normal driving position;

Fig. 2 is a plan view in section of the spring-carrying ring;

Fig. 3 is a plan view of the cam locking device;

Fig. 4 is a vertical sectional view of the central part of the tool holder, in the de-clutched position.

The shank 2 of the torque-limiting tool holder is introduced into the hollow spindle 1 of the machine. The said shank is immobilised with respect to the spindle by a bolt 3 carried by the said spindle. The position of the shank 2 in the longitudinal direction is determined by a nut 4 and a lock nut 5. The nut 4 carries studs such as 6 which penetrate into corresponding notches provided in the end of the spindle.

The lower end of the shank 2 is hollow and its outer surface is smooth. Arranged on the shank are an adjusting nut 8, a washer 9, a spring-carrying ring 10 and a washer 11.

The spring-carrying ring 10 is illustrated in sectional view in Fig. 1, and in plan view in Fig. 2. Formed in the lower portion of the said ring are the equidistant blind holes 12, to the number of twelve, for example (Fig. 1). A spring 13 is mounted in each of these holes. Slidable above the ring 10 is a cam 14 comprising a split collar whose two parallel faces 15 and 16 (Fig. 2) are guided by corresponding surfaces of the ring 10. The latter comprises also two housings 17 and 18, each of which contains a compression spring, 19 and 20, respectively, which tend to urge a portion of the cam in a radial outward direction.

The ring 10 is surrounded by a sleeve 21 or "cam locking device" which, in the position illustrated in Fig. 1, prevents any radial displacement of the cam 14. The said cam locking device bears against the washer 11 and, as Fig. 3 shows, carries two small bars 22 and 22a which in turn carry two springs 23 and 24 whose free ends abut against the washer 9 (Fig. 1). The nut 8 comprises a plurality of tapped radial holes 25, in such manner that the said nut is adapted to be fixed in one of several positions by means of a screw 26 extending through one of the said tapped holes and abutting against the end of a recess such as 27 which is formed in the shank 2.

Mounted in the hollow end of the shank 2 is a nose piece 28 whose head 29 carries the working tool, a tap, for example. The nose piece carries a plate 30 which is formed with a certain number of holes such as 31, which are distributed over the whole periphery of the said plate. The latter is surrounded by a sleeve 33 which forms the end of the shank 2 and whose top end comprises a number of holes corresponding in number to the holes in the plate 30. Balls such as 34 are mounted in the holes of the sleeve, the diameter of the said holes being larger than that of the balls so that the latter can rotate freely relatively to the said holes. On the other hand, the holes such as 31 formed in the plate are of smaller diameter than the diameter of the balls, so that the latter can only penetrate partially therein.

The perforated plate or collar 30 is rendered fast with the nose piece 28 by two keys 36 and 37 which are held by a supporting ring 38. Situated between this ring and the tool holder head 29 is a compression spring 39. The perforated plate 30 also bears against a ring 40 comprising a certain number of orifices which are arranged concentrically about the axis of the apparatus, and each of which contains a ball such as 41, the said balls being in contact with the supporting ring 38. The orifices of the ring 40 are slightly smoothed at their ends which face towards the axis of the apparatus, whilst the balls are prevented from escaping from their housings by an elastic ring 43 surrounding the ring 40. Finally, the ring 40 containing the balls is held in position by an elastic ring 44 which, at the time of assembly, is inserted into an annular groove 45 formed in the end of the sleeve 33.

The tool holder operates in the following manner: The spindle 1 of the machine is driven in rotational movement and the tool holder assembly rotates with the said spindle. In fact, with the nut 8 appropriately adjusted by means of the various holes adapted to receive the screw 26, the distance between the washer 9 and the perforated plate 30 is such that the springs 13 are compressed and the balls 34 are strongly thrust into the holes such as 31 provided in the perforated plate 30. Thus the said balls become locked and transmit a driving torque between the shank 2 and the perforated plate 30, i. e. between the shank 2 and the nose piece 28 which is secured to the perforated plate 30.

When the driven tap encounters an obstacle which might cause the tool to break, the resistant or counter torque exceeds a predetermined limit value determined by the position of the nut 8 and the force of the springs 13. The balls 34 are then expelled from the holes such as 31, and the lower part of the device, constituted by the tool, the nose piece 28, the keys 36 and 37, the perforated plate 30 and the supporting ring 38, is declutched and thus no longer rotates. The rest of the apparatus continues to rotate with the spindle 1. However, the spindle of the machine continues to advance and the whole of the apparatus continues to be displaced axially, except for the tool and the nose piece 28, which are immobilised. The axial displacement is permitted by the compression of the spring 39 and by the keys 36 and 37 sliding in their grooves 46 and 47.

Furthermore, when the balls 34 are expelled from the perforated plate 30, the washer 11 and the cam locking device 21 are raised. The bent-over upper edge 48 of the cam locking device then occupies the position illustrated in Fig. 4 and allows the cam 14 to escape in the radial direction. The movement of this cam can be used to operate a signal, and can thus bring about the stoppage of the spindle 1. In the constructional example illustrated in the drawings, the cam 14 actuates an electric switch by means of a finger which is shown diagrammatically at 49.

I claim:

1. A tool holder comprising, a rotatable driving member, a driven member coaxial therewith and having means for holding a tool, a torque-controlled axial clutch for coupling said driving and driven members and for uncoupling them when a predetermined value of counter-torque is applied to the driven member, comprising; means fixed to said driven member defining a plurality of spaced indentations concentric with the longitudinal axis of said members, a plurality of spherical members equal in number to said indentations, means fixed to the driving member for normally retaining said spherical members in individual alignment with said indentations and adapted to allow the spherical members to move in opposite directions axially of the tool holder, each of said indentations being adapted to receive a portion of an individual spherical member and cooperate therewith in releasably coupling the driving and driven members, means including means displaceable axially on the tool holder for adjustably applying a pressure on said spherical members and including resilient means cooperating with said last mentioned means for normally biasing the spherical members in a direction axially of the tool holder and toward engaging the indentations, to releasably couple the driving and driven members, cam means normally biased in a direction radially outwardly of the tool holder for indicating when said predetermined value of counter-torque is reached and for initiating the stopping of said driving member when said predetermined value of counter-torque obtains, the axially displaceable pressure-applying means having means normally holding said cam means in a locked position and arranged to release said cam means when displaced axially in a direction opposite to the direction in which said coupling pressure is normally applied to said spherical members, whereby when a counter-torque corresponding to said predetermined counter-torque is applied to said driven member said means defining the indentations is angularly displaced relative the means normally retaining the spherical members in alignment with said indentations, thereby moving the spherical members axially in a direction for disengaging them from said indentations so as to uncouple the driving and driven members and said pressure applying means is displaced in the cam-releasing direction.

2. A tool holder according to claim 1, in which said means for applying said biasing pressure on the spherical members comprises an annular member disposed overlying said spherical members, circumferentially around said driving member and movable axially of the driving member, and in which said resilient means comprise a plurality of spaced springs disposed substantially concentrically about the axis of said driven member and biasing said annular member into constant contact with said spherical members.

3. A tool holder according to claim 1, including means to adjustably compress the springs thereby to selectively control the value of the counter-torque at which said driving and driven members are uncoupled.

4. A tool holder according to claim 1, in which said means for normally retaining said spherical members individually aligned with the individual indentations comprises a sleeve fixed to said driving member in which said driven member is disposed axially thereof, said means defining the indentations comprising an annular collar fixed to said driven member and rotatably mounted internally of said sleeve.

5. A tool holder according to claim 1, in which said driving member comprises a first sleeve and said means for normally retaining said spherical members individually aligned with individual indentations comprises a second sleeve fixed to said driving member in which said driven member is disposed axially thereof, said means defining the indentations comprising an annular collar fixed to said driven member rotatably mounted internally of said second sleeve, means for fixing the collar to the driven member for rotation therewith, said driven member being provided with angularly spaced guide means cooperating with said last mentioned means for selectively allowing the driven member to move axially of the clutch and the driving member.

6. A tool holder according to claim 5, including resilient means cooperating with said second sleeve to maintain said driven member in a predetermined extended position relative to the driving member.

7. A tool holder according to claim 6, in which said resilient means comprises a compression spring disposed circumferentially around said driven member and is arranged to allow the driven member to be selectively displaced axially of the clutch and driving member.

8. A tool holder according to claim 1, in which said cam means comprises a split collar having a first portion fixed on said driving member for rotation therewith and a second portion constantly biased in a direction radially of the driving member, and resilient means constantly biasing the second portion in said radial direction.

References Cited in the file of this patent

UNITED STATES PATENTS

| 1,657,274 | Niedhammer | Jan. 24, 1928 |
| 1,672,964 | Stull | June 12, 1928 |
| 1,881,633 | Johnson | Oct. 11, 1932 |
| 1,883,164 | Vassakos | Oct. 18, 1932 |
| 2,182,627 | Gauld | Dec. 5, 1939 |
| 2,263,709 | Van Sittert | Nov. 25, 1941 |
| 2,293,786 | Worden | Aug. 25, 1942 |
| 2,342,540 | Hale | Feb. 22, 1944 |
| 2,396,040 | Darling | Mar. 5, 1946 |
| 2,728,579 | Djidch | Dec. 27, 1955 |
| 2,732,746 | Livermont | Jan. 31, 1956 |
| 2,786,377 | Riess | Mar. 26, 1957 |

FOREIGN PATENTS

| 697,021 | Great Britain | Sept. 16, 1953 |
| 846,203 | France | May 27, 1939 |